(12) United States Patent
Islam et al.

(10) Patent No.: US 7,065,563 B2
(45) Date of Patent: Jun. 20, 2006

(54) VISIBLE MULTI-LEVEL ONLINE-OFFLINE CONFIGURATION CONTROL

(75) Inventors: Shah Mohammad Rezaul Islam, Cary, NC (US); Mark E. Molander, Cary, NC (US); Michael J. Ryan, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 10/022,135

(22) Filed: Dec. 12, 2001

(65) Prior Publication Data

US 2003/0135590 A1   Jul. 17, 2003

(51) Int. Cl.
*G06F 15/177* (2006.01)

(52) U.S. Cl. ...................... 709/220; 709/228
(58) Field of Classification Search ............... 709/100, 709/220, 221–224, 225
See application file for complete search history.

(56) References Cited

U.S. PATENT DOCUMENTS

| | | | |
|---|---|---|---|
| 5,394,522 A | 2/1995 | Sanchez-Frank et al. ... | 715/735 |
| 5,579,482 A | 11/1996 | Einkauf et al. ............. | 709/220 |
| 5,724,509 A | 3/1998 | Starkweather et al. ...... | 709/220 |
| 5,805,897 A | 9/1998 | Glowny ....................... | 717/178 |
| 5,819,030 A * | 10/1998 | Chen et al. .................. | 709/220 |
| 5,841,972 A | 11/1998 | Fanshier ...................... | 709/220 |
| 5,845,090 A | 12/1998 | Collins, III et al. ......... | 709/221 |
| 6,009,274 A | 12/1999 | Fletcher et al. ............. | 717/173 |
| 6,026,438 A * | 2/2000 | Piazza et al. ................ | 709/221 |
| 6,029,196 A * | 2/2000 | Lenz ........................... | 709/221 |
| 6,041,347 A | 3/2000 | Harsham et al. ............ | 709/220 |
| 6,061,332 A | 5/2000 | Branton, Jr. et al. ........ | 370/241 |
| 6,138,153 A | 10/2000 | Collins, III et al. ......... | 709/221 |
| 6,209,031 B1 * | 3/2001 | Casey et al. ................. | 709/222 |
| 6,243,747 B1 | 6/2001 | Lewis et al. ................. | 709/220 |
| 6,243,815 B1 | 6/2001 | Antur et al. ................. | 713/201 |
| 6,289,512 B1 * | 9/2001 | Edwards et al. ............. | 717/178 |
| 6,378,127 B1 * | 4/2002 | Delo ............................ | 717/174 |
| 6,505,245 B1 * | 1/2003 | North et al. ................. | 709/223 |
| 6,684,244 B1 * | 1/2004 | Goldman et al. ............ | 709/223 |
| 6,701,450 B1 * | 3/2004 | Gold et al. ................... | 714/5 |
| 6,738,834 B1 * | 5/2004 | Williams et al. ............. | 710/8 |
| 6,772,204 B1 * | 8/2004 | Hansen ........................ | 709/220 |
| 2002/0124064 A1 * | 9/2002 | Epstein et al. ............... | 709/221 |
| 2002/0198975 A1 * | 12/2002 | Bogia .......................... | 709/223 |

* cited by examiner

*Primary Examiner*—Zarni Maung
*Assistant Examiner*—Van Kim T Nguyen
(74) *Attorney, Agent, or Firm*—Randall J. Bluestone, Esq.; Harrington & Smith, LLP

(57) ABSTRACT

A method and system presents a plurality of selections to a user for updating a system configuration from the choices of: an immediate mode, a scheduled queued mode, a queued mode, and an optimized activation mode. The immediate mode activates all change requests immediately. The scheduled queued mode queues all change requests and activates the change requests at a predetermined time. The queued mode queues all change requests and activates the change requests after receiving a triggering event. The optimized activation mode analyzes the system usage to determine and optimally vary the mode among the immediate mode, the scheduled queued mode, and the queued mode.

27 Claims, 10 Drawing Sheets

VISIBLE MULTI-LEVEL ONLINE-OFFLINE CONFIGURATION CONTROL

BACKGROUND OF THE INVENTION

1. Field of the Invention

This invention generally relates to the field of device configuration control, and more particularly relates to a system and method for controlling the configuration parameters of systems, such as server systems or networked storage systems.

2. Description of Related Art

A problem with many storage products today relates to when and how configuration changes get updated to their associated storage system. These changes may include configuring IP addresses for ports; adding new storage disks; adding, modifying, or deleting end users; or modifying backup schedules. Most high-end NAS (Network Attached Storage) systems have only one option for configuration changes. Either the changes are activated immediately, or are queued until later, when they are manually activated by a system administrator (hereafter referred to as a user). In other systems, certain changes are activated immediately, while others are queued. This introduces some problems, such as:

- Users don't easily know which changes are immediate vs. queued. Some visual indication is usually provided, but it's not a simple model for users to understand this distinction, which varies at the parameter-level throughout the application, not at the system-level. Some pages might even have a mix of immediate and queued settings.
- Users are not in control of when changes get activated.
- Users may, at least initially or in an emergency, prefer all changes to be activated dynamically and immediately.
- Users may want to queue ALL changes if remote or during initial setups. This is essentially the same mode of operation when users manually edit a flat-file configuration and then activate all the changes at once at a later time.

Some ad ministration consoles immediately update each configuration change. This has proven to be a problem for customers as each change may take a long period of time to complete, making the system inaccessible during this time. Since these systems are clustered, all activity must be synchronized. Therefore, for example, it may take up to 30 minutes to activate the changes.

Therefore a need exists to overcome the problems with the prior art as discussed above, and particularly for an improved method of controlling the configuration parameters of networked storage systems.

SUMMARY OF THE INVENTION

According to a preferred embodiment of the present invention, a method and system presents a plurality of selections to a user for updating a system configuration from the choices of: an immediate mode, a scheduled queued mode, a queued mode, and an optimized activation mode. The immediate mode activates all changes immediately. The scheduled queued mode queues all changes and activates the changes at a predetermined time. The queued mode queues all changes and activates the changes after receiving a triggering event. The optimized activation mode analyzes the system usage to determine and optimally vary the mode among the immediate mode, the scheduled queued mode and the queued mode.

DESCRIPTION OF THE PREFERRED EMBODIMENTS

The present invention, according to a preferred embodiment, overcomes problems with the prior art by providing an option to the user to enable him/her to decide the optimal time frame for updating the system configuration parameters. The ability to "flip a switch" and have configuration changes activated from within a User Interface (UI) context is a profound ease-of-use benefit.

A preferred embodiment provides a highly accessible and visible control for the user to switch between multiple activation modes. According to a preferred embodiment of the present invention, the following various activation modes may be accommodated with this visible control.

- Immediate—all changes are immediately activated.
- Scheduled Queued—all changes are queued until later activation, which is scheduled (e.g., for a low-impact time such as 3:00 AM)
- Queued—all changes get queued until later manually activated.
- Optimized Activation—the system would determine the best method of updating the system configuration, with some changes being immediate and some being queued for later.

All approaches, spanning from immediate activation of changes to queuing changes for later activation, have their benefits depending on the user and his circumstance (home, initial configuration, major configuration update, emergency, etc.). For example, if the user's NAS system has multiple nodes, and the same change is being made to each node, it will typically be most appropriate to queue up all the changes for each node and then make all the changes at once. However, for events such as a disaster recovery, the user may want to activate all changes immediately.

Figure 1:
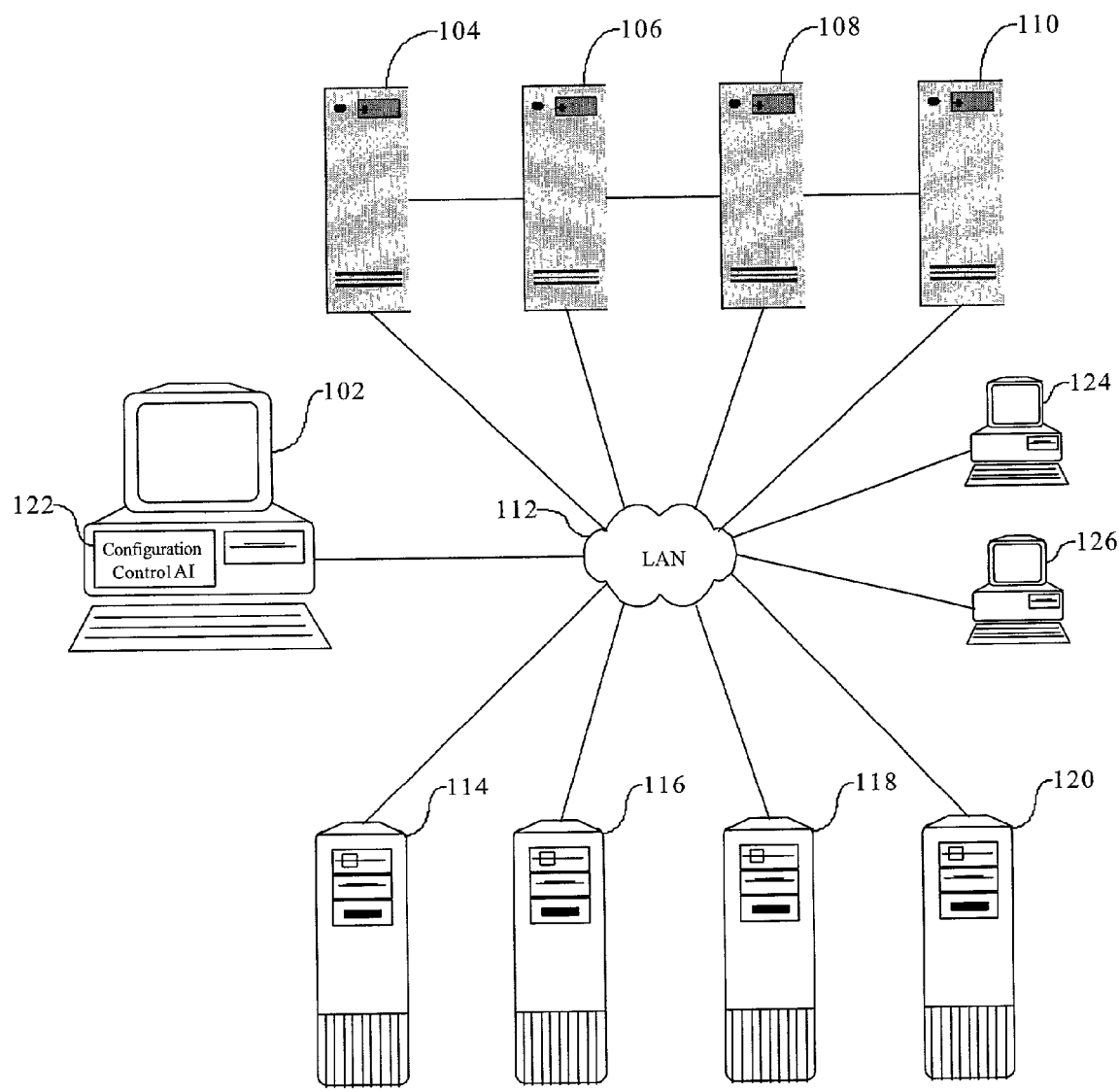
FIG. 1 is a block diagram illustrating a network attached storage system with a user-controlled configuration in accordance with a preferred embodiment of the present invention.

FIG. 1 illustrates an exemplary network attached storage system in accordance with a preferred embodiment of the present invention. The system includes at least one network attached storage system 104, 106, 108, 110 that is communicatively coupled to a client computer system 102, 124, 126 via a local area network interface 112. The local area network interface 112 may be a wired communication link or a wireless communication link. At least one client computer system contains a user-controlled configuration administration interface 122 for determining the method for updating configuration changes. The network attached storage system 104, 106, 108, 110 may also be communicatively coupled with the world-wide-web, via a wide area network interface (not shown) via a wired, wireless, or combination of wired and wireless local area network communication links 112. Additionally, at least one server 114, 116, 118, 120 may be communicatively coupled to the network attached storage system 104, 106, 108, 110 via the local area network interface 112. The user-controlled configuration administration interface 122 may also be located on a server 114, 116, 118, 120 or on a remote computer system connected via the world-wide-web.

Figure 2:
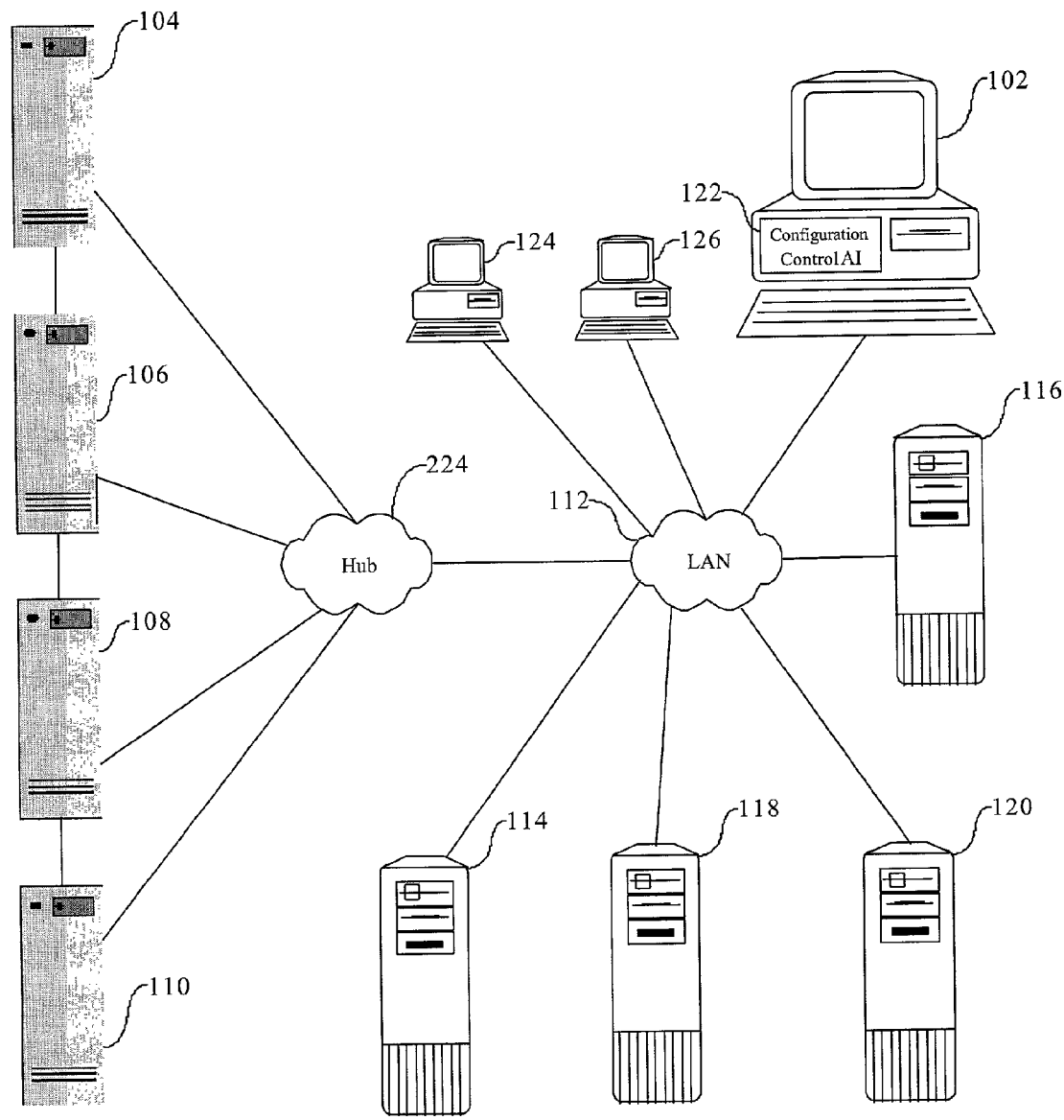
FIG. 2 is a block diagram illustrating a storage area network system with a user-controlled configuration in accordance with a preferred embodiment of the present invention.

Alternatively, FIG. 2 illustrates a storage area network system 200 in accordance with a preferred embodiment of the present invention. In this configuration, at least one network attached storage system 104, 106, 108, 110 is communicatively coupled to at least one server 114, 116, 118, 120 and each other via a hub 224 or another wired, wireless, or combination of wired and wireless local area network communication links. Each server 114, 116, 118, 120 is, in turn, communicatively coupled to a client computer system 102, 124, 126 and each other, via a local area network interface 112. At least one server 114, 116, 118, 120 may also be communicatively coupled with the world-wide-web, via a wide area network interface (not shown) via a wired, wireless, or combination of wired and wireless local area network communication links 112. In this system, at least one client computer system 102 contains the user-controlled configuration administration interface 122 for determining the method for updating configuration changes, however, the user-controlled configuration administration interface 122 may also be located on a server 114, 116, 118, 120 or on a remote computer system connected via the world-wide-web.

Figure 3:
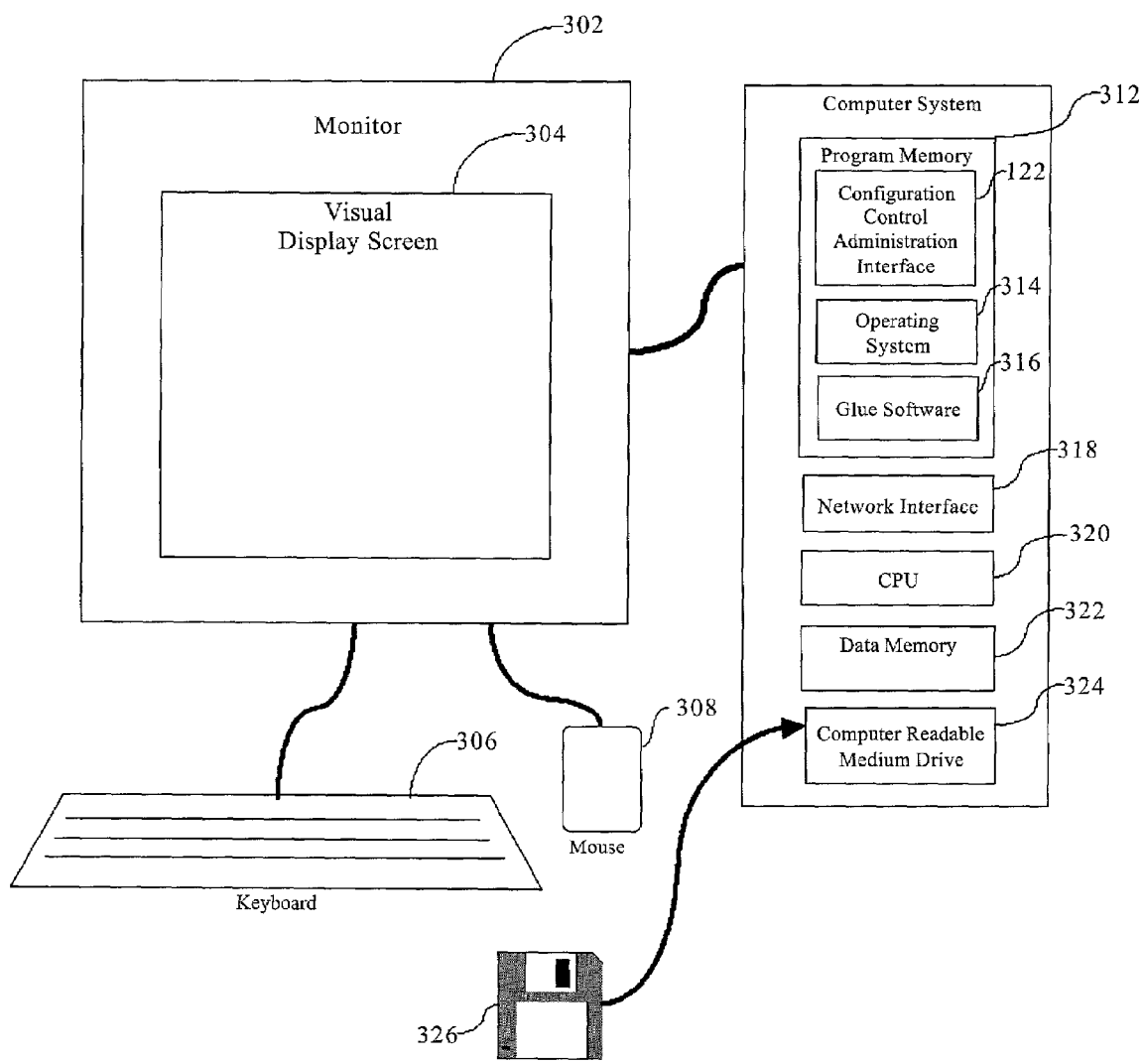
FIG. 3 is a more detailed block diagram showing a client computer system in the system of FIG. 1 according to a preferred embodiment of the present invention.
Figure 4:
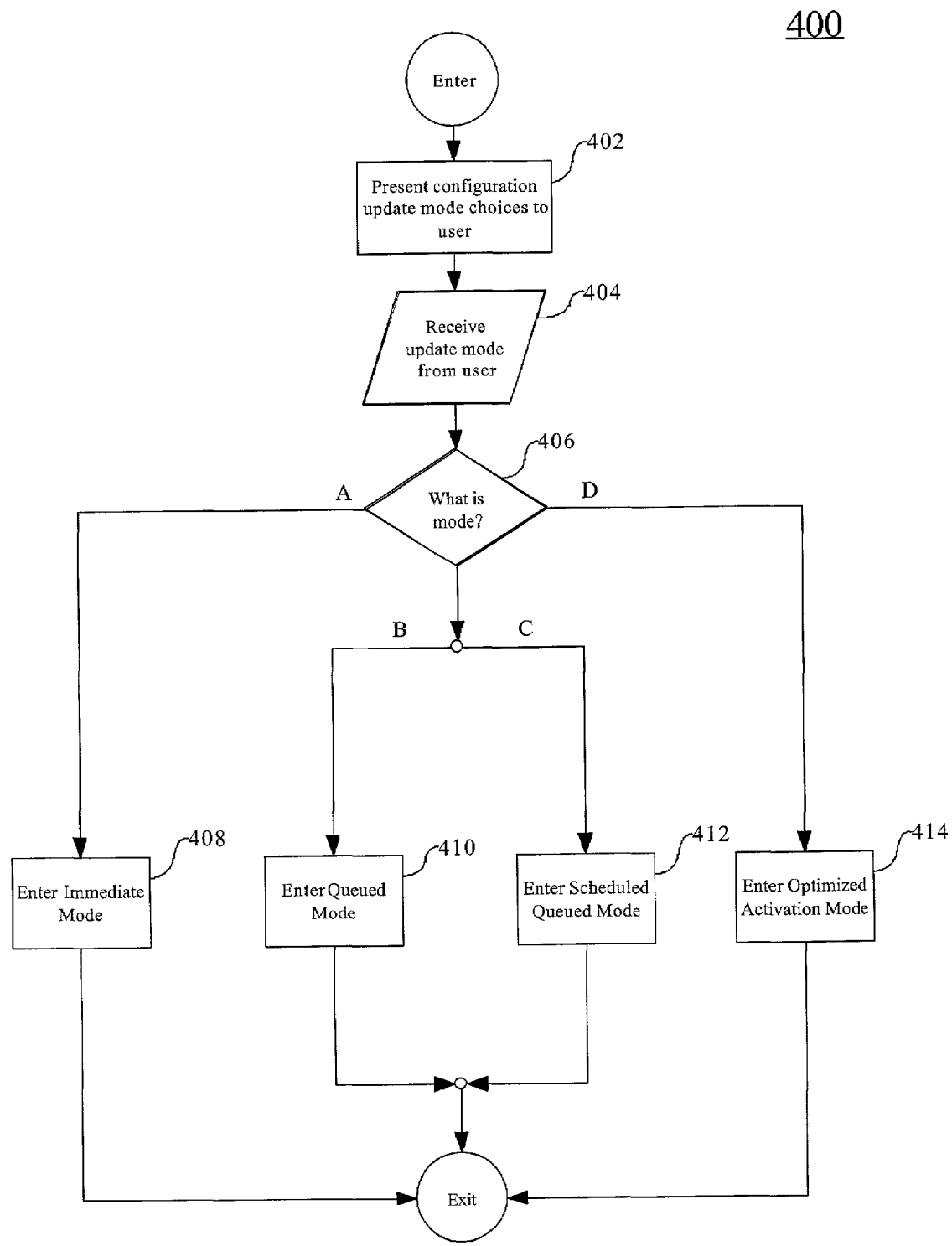
FIGS. 4, 5, 6, 7 and 8 are operational flow diagrams illustrating exemplary operational sequences for the system of FIG. 1, according to a preferred embodiment of the present invention.

Referring to FIG. 3, each client computer system 102 may include, inter alia, one or more computers, a display monitor 302, and at least a computer readable medium 326. The computers preferably include means for reading and/or writing to the computer readable medium. The computer readable medium allows a computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface 318, including a wired network or a wireless network, that allow a computer to read such computer readable information.

FIG. 3 illustrates a client computer system 102, according to the present example, that includes a controller/processor unit 320, which processes instructions, performs calculations, and manages the flow of information through the computer system 102. Additionally, the controller/processor 320 is communicatively coupled with program memory 312. Included within program memory 312 are a configuration control administration interface 122 (which will be discussed later in greater detail), operating system platform 314, and glue software 316. The operating system platform 314 manages resources, such as the data stored in data memory 322, the scheduling of tasks, and processes the operation of the configuration control administration interface 122 in the program memory 312. The operating system platform 314 also manages a graphical and/or character-based display interface that, according to the present example, comprises the screen 304 on the display monitor 302. Information is displayed via the screen 304 for visual output of information to a user of the computer system 102. A user input interface comprises the keyboard 306 and the mouse 308 for receiving user input from a user of the computer system 102. A communication network interface 318 allows for communicating with a network link 112. Additionally, the operating system platform 314 also manages many other basic tasks of the computer system 102 in a manner well known to those of ordinary skill in the art.

Glue software 316 may include drivers, stacks, and low-level application programming interfaces (API's) and provides basic functional components for use by the operating system platform 314 and by compatible applications that run on the operating system platform 314 for managing communications with resources and processes in the computing system 102.

The controller/processor unit 320 manages resources, such as the data stored in data memory 322, the scheduling of tasks, and the operation of the configuration control administration interface 122 in the program memory 312. The controller/processor unit 320 may also manage a communication network interface 318 for communicating with the network link 112, and a computer-readable medium drive 324. Additionally, the controller/processor unit 320 also manages many other basic tasks of the computer system 102 in a manner well known to those of ordinary skill in the art.

Although a network attached storage system 100 is described in detail, the methods described with respect to the preferred embodiments of the present invention may also be used to control the updating of configuration parameters in a variety of other network systems such as printers, scanners, personal digital assistants (PDAs), hubs, gateways, applications, servers, systems or any other device that has configuration parameters that can be controlled via a networked application. Alternatively, the instructions for performing these methods may be contained in the memory of a general-purpose computer system 102.

FIGS. 4, 5, 6, 7 and 8, are operational flow diagrams illustrating exemplary operational sequences for the system of FIG. 1. The system 100 enters the sequence, at step 402, wherein the configuration control administration interface 122 presents a number of configuration update modes to a user. At step 404, the configuration control administration interface 122 receives an update mode selection from the user. The system, at step 406, decides which configuration update mode to select based on the user input. If the user selects "Immediate", then the system follows path A and enters the Immediate Mode, at step 408. Likewise, for each of the other selections, a selection of "Queue" instructs the system to follow path B and enter the Queued Mode, at step 410; a selection of "Scheduled queue", instructs the system to follow path C and enter the Scheduled Queued Mode, at step 412; and the selection of "Optimized Activation" causes the system to follow path D and enter the Optimized Activation Mode, at step 414.

Figure 5:
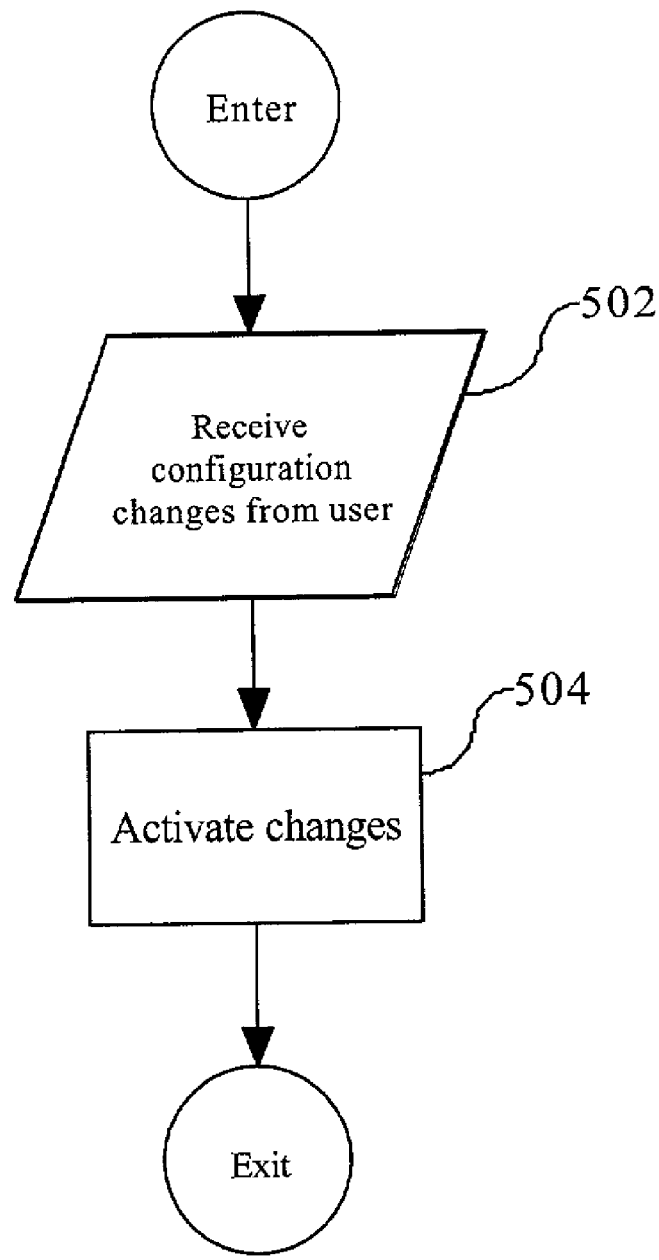

FIG. 5 illustrates a more detailed view of the Immediate Mode. The system 100 enters a process, at step 502, where the configuration control administration interface 122 receives a configuration change request from a user (e.g., adds a new end user). The user in this case is the system administrator. The user may, for example, send the change request by hitting an "OK" pushbutton on the configuration control administration interface 122. At step 504, the change gets activated in the system immediately.

Figure 6:
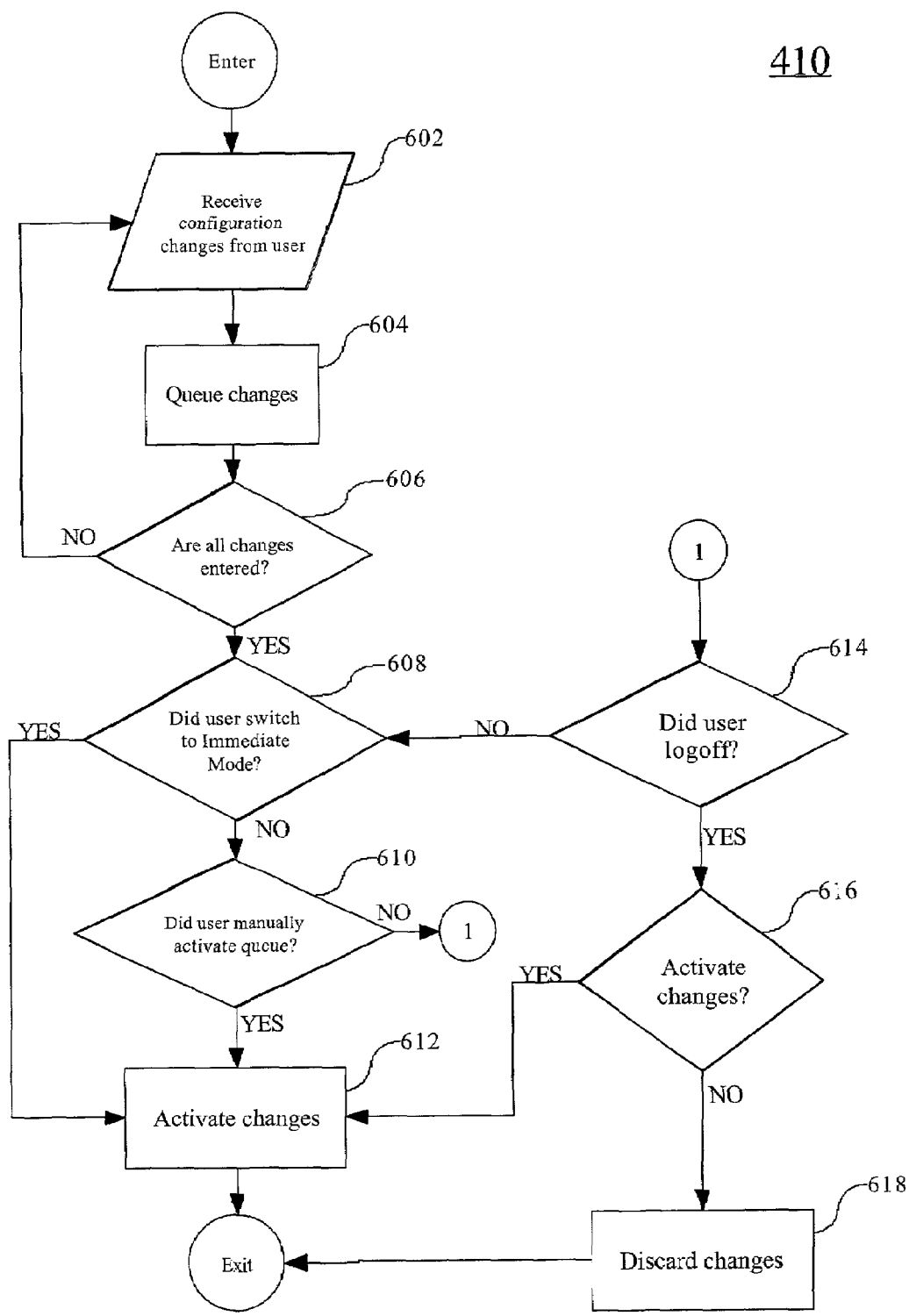
Figure 7:
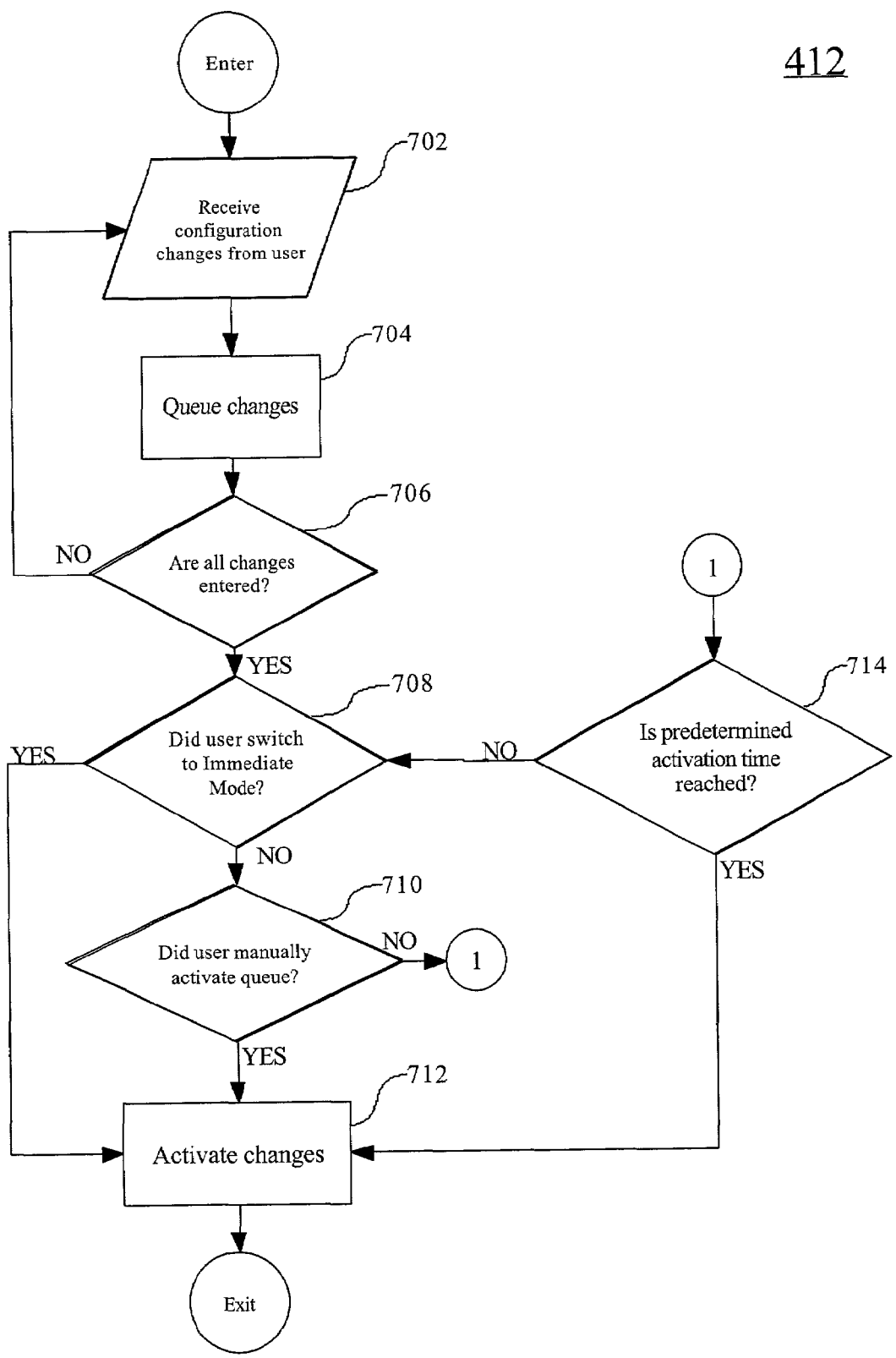

FIG. 6 shows a more detailed view of the Queued Mode. The system 100 enters the process, at step 602, where the configuration control administration interface 122 receives a configuration change request from a user. At step 604, the change request gets temporarily queued (does not get activated yet). These steps may be repeated over and over, at step 606, with many changes getting queued up. The queued changes get activated in the system when one of three following things occur:

1. The system administrator user switches to "Immediate" activation mode, which automatically activates any changes in the queue at step 608.
2. The system administrator user manually activates the queue at step 610 (e.g., selects "Activate queue now" menu choice).
3. The system administrator user logs off, at step 614. Then, the user is warned, at step 616, that there are changes that have not yet been activated, and is prompted to activate them, at step 612, or lose them, at step 618, before logging off.

The Scheduled Queue Mode (shown in FIG. 7) is similar to the Queue Mode flow that is detailed above. The system enters the process at step 702 where the configuration control administration interface 122 receives a configuration change from a user. At step 704, the change gets temporarily queued. These steps may be repeated over and over, at step 706, with many changes getting queued up. For this mode, the queued changes get activated in the system when one of three things occur:

1. The system administrator user switches to "Immediate" activation mode, which automatically activates any changes in the queue at step 708.
2. The system administrator user manually activates the queue at step 710 (e.g., selects "Activate queue now" menu choice).
3. A predetermined activation time, if enabled, is reached at step 714. The activation time may be absolute or relative to another event (e.g. 30 minutes after user logs off).

The changes are then activated, at step 712.

Figure 8:
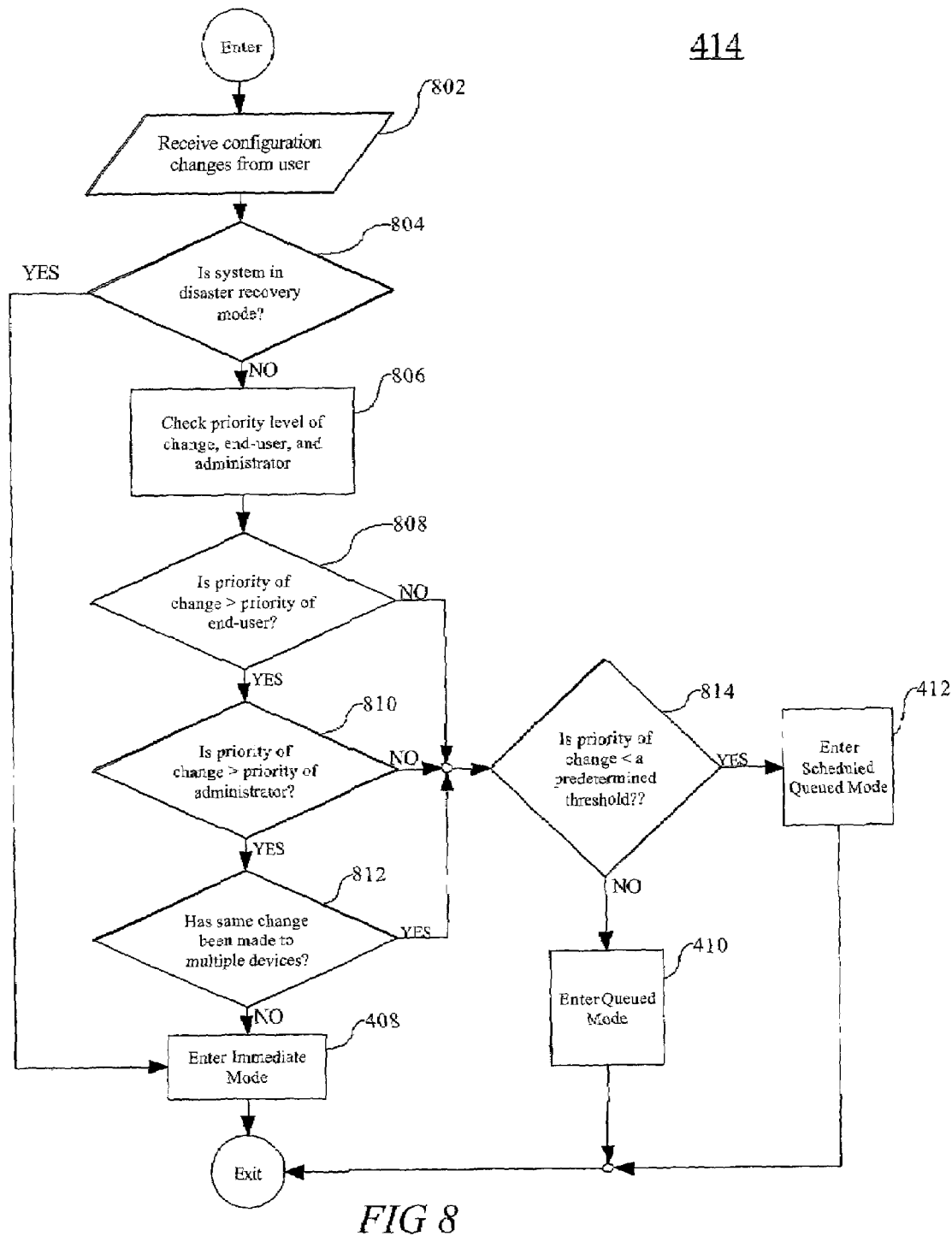

FIG. 8 illustrates the Optimized Activation mode. This is a most complicated flow sequence, since it automates the activation type for the user. A change either gets activated in the system immediately or gets queued for a later time, depending on the optimized activation settings and automated intelligence in the system. A few of the factors that affect whether the optimized activation setting immediately activates changes or queues until later are the importance of not disrupting the general end users of the system, the importance of not disrupting administrator usage, the disruptiveness of a change to end users, and the disruptiveness of a change to administrator users. For example, if users are system developers, then it may only be "desirable" to not disrupt them, whereas if they are web users (customers), it might be "critical" to not disrupt them. In a test situation, disrupting end users might be set to "Doesn't matter". For administrators, it could be that some admin users get very annoyed with the minutes it might take to activate most changes and want to queue them. New admin users might not trust the queuing and want each change request to get immediately activated. Some change requests might force the system to reboot, and/or users to perform some action such as remounting a drive or logging back on. Such change requests, perhaps, should be queued until an "Absolute activation time". Some change requests might activate quickly, in a matter of a few seconds, whereas others might take a long time, such as a few minutes, as they are propagated across a clustered system with proper error checking, etc. These could be queued up until a "Relative activation time" (such as right after the admin user logs off). Other things might affect how the activation get optimized, such as:

If the system detects that a user is performing disaster recover actions in an emergency situation, then change requests should be activated either immediately, or queued and then activated when the admin user clicks the final "OK" button while doing his key task.

If system detects that a user is making similar types of change requets to each server in a clustered system, the system should wait until each server is modified until activating similar changes and synching them across the whole cluster.

The admin user can set the importance of not disrupting end users, and not disrupting his admin performance with a priority rating. For example, on a 5 point scale:

Critical=4
Very important=3
Important=2
Desirable=1
Doesn't matter=0

Each configuration change may also have an associated priority rating so that, for example, a very quick or important task may be given a very high rating, while a task that may disrupt the system for a longer period of time may be given a very low priority rating.

In a preferred embodiment, the system enters the process, at step 802, where the configuration control administration interface 122 receives a configuration change request from a user. At step 804, the configuration control administration interface 122 checks to see if the system is in a disaster recovery mode. If so, the system enters into the Immediate Mode and follows the procedure for that mode. If not, the priority level of the end-user, administrator, and the change itself are checked, at step 806. If the priority of the change request is higher than the priority of the end-user or the system administrator, or the system determines that the same change request is being made to multiple devices, that change will be slated for a Queued Mode, at steps 808, 810, and 812; otherwise, the system enters into the Immediate Mode and follows the procedure for that mode. The configuration control administration interface 122 then compares the priority rating to predetermined threshold level, at step 814. If the priority rating of the change is below the threshold, the system will enter the Scheduled Queued Mode, if not, the system enters the Queued Mode. This allows a user to set a limit for non-vital change requests to be performed at a scheduled time.

Figure 9:
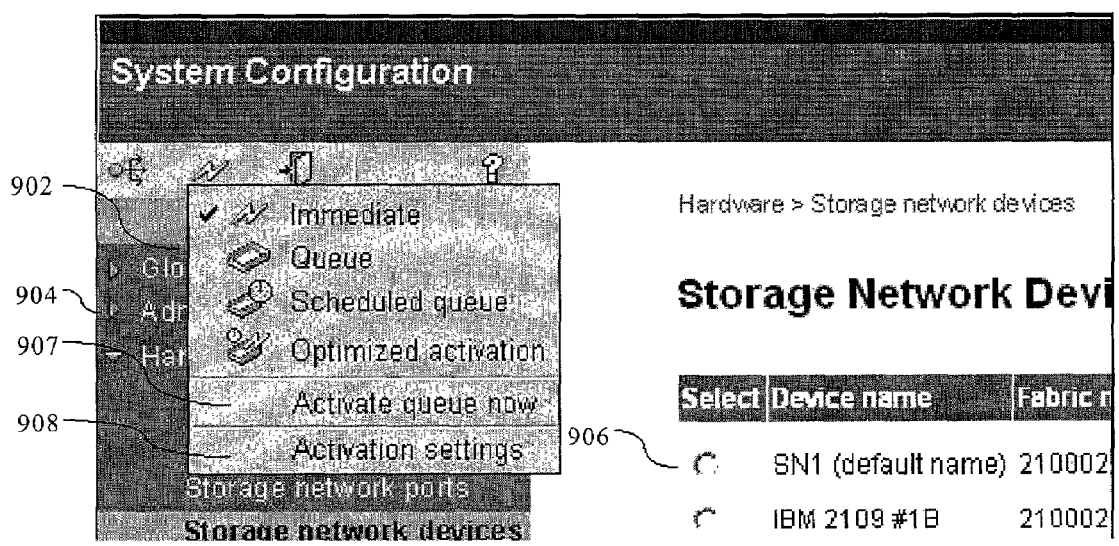
FIG. 9 is an exemplary administration interface displaying a menu for the system of FIG. 1, according to a preferred embodiment of the present invention.

FIG. 9 is an exemplary administration interface displaying a menu for the system of FIG. 1, according to a preferred embodiment of the present invention. The menu preferably includes a selection area for the configuration update mode 902. A menu choice for an interface window displaying an implementation of activation settings 908 (shown in FIG. 10) is also included, as well as a menu choice 907 for activating the change requests immediately. In addition to the menu, other key user interface components include a navigation area to display the type of information to configure 904, and a content area for users to set particular configuration information to update 906.

Figure 10:
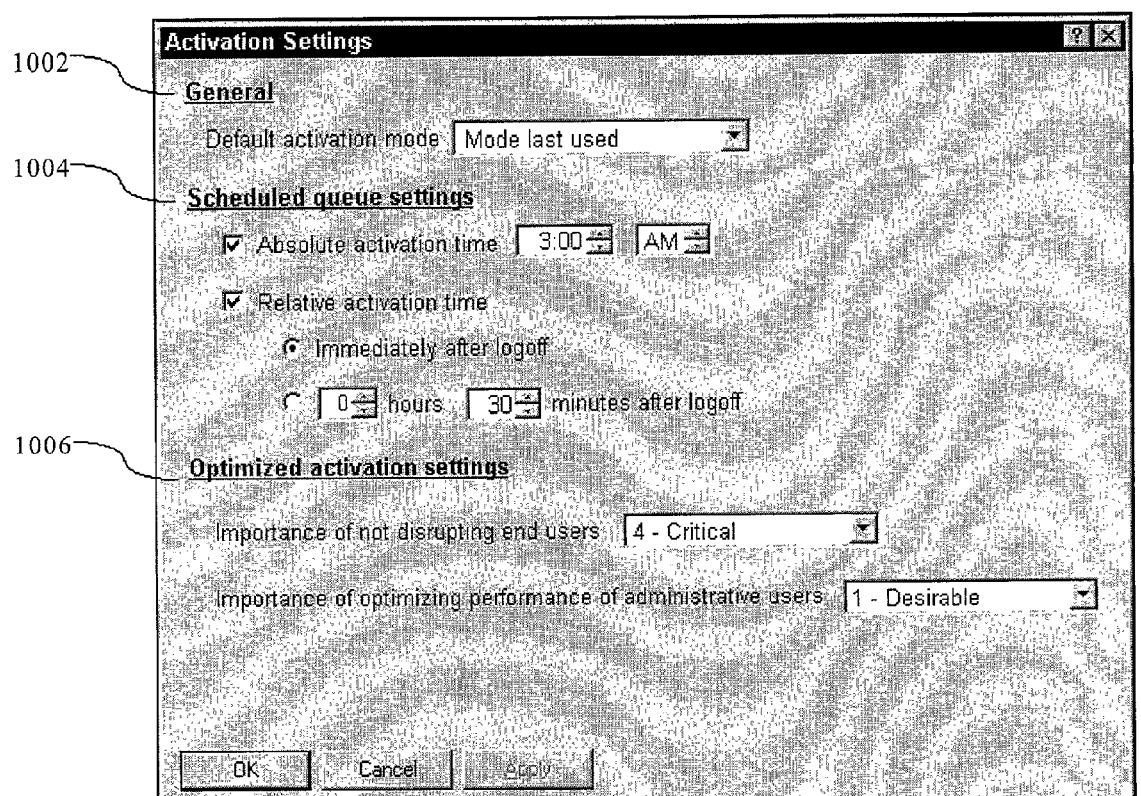
FIG. 10 is an exemplary interface window displaying an implementation of activation settings for the system of FIG. 1, according to a preferred embodiment of the present invention.

FIG. 10 displays an exemplary activation settings window. It may preferably contain a field 1002 for selecting a default activation mode, fields 1004 for selecting a time (relative or absolute) for activating queued changes, and fields 1006 for setting the priority rating for optimizing effects on both users and end users.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

A preferred embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of updating a system configuration comprising:
presenting a plurality of selections for updating a system configuration from predetermined modes;
receiving a selected mode; and
executing the selected mode, wherein the predetermined modes comprise an immediate mode, a scheduled queued mode, a queued mode, and an optimized activation mode,
wherein the optimized activation mode comprises:
receiving a configuration change request from a user;
determining if a system is in a disaster recovery mode;
activating the change request if the system is in a disaster recovery mode;
comparing a priority rating for the change request to a priority rating for end-user disruption; and
queuing the change request for later activation when the change priority rating is lower than the end-user disruption rating.

2. The method of claim 1, wherein the immediate mode comprises the steps of:
receiving a configuration change request from a user; and
activating the change request immediately.

3. The method of claim 1, wherein the scheduled queued mode comprises:
receiving configuration changes from a user;
queuing all the change requests; and
activating the change requests at a predetermined time.

4. The method of claim 1, wherein the queued mode comprises:
receiving configuration change requests from a user;
queuing the configuration change requests; and
activating the configuration change requests upon receiving a triggering event.

5. The method of claim 3, wherein the predetermined time is an absolute time.

6. The method of claim 3, wherein the predetermined time is relative to a triggering event.

7. The method of claim 6, wherein the triggering event is the user logging off.

8. The method of claim 4, wherein the triggering event comprises at least one of: the user manually activating the change requests, the user enabling an immediate mode, and the user logging off.

9. The method of claim 1, wherein the optimized activation mode further comprises:
comparing a priority rating for the change request to a priority rating for administrator disruption; and
queuing the change request for later activation when the change priority rating is lower than the administrator disruption rating.

10. The method of claim 9, wherein the optimized activation mode further comprises:
determining if the configuration change request is likely to be repeated for more than one system device; and
queuing the change request for later activation when the change is likely to be repeated.

11. The method of claim 10, wherein the optimized activation mode further comprises:
comparing a priority rating for the queued change request to a predetermined threshold;
activating the change request at a predetermined time when the change priority rating is lower than the predetermined threshold; and
activating the change request upon receiving a triggering event when the change priority rating is greater than the predetermined threshold.

12. The method of claim 11, wherein the triggering event comprises at least one of: the user manually activating the change requests, the user enabling an immediate mode, and the user logging off.

13. A system comprising:
a network interface;
a computer system, communicatively coupled to the network interface; and
a configuration control interface, communicatively coupled to the computer system, for presenting a plurality of selections from predetermined modes for updating a system configuration of a configurable system, wherein the predetermined modes comprise an immediate mode, a scheduled queued mode, a queued mode, and an optimized activation mode, wherein the optimized activation mode comprises:
receiving a configuration change recquest from a user;
determining if a system is in a disaster recovery mode;
activating the change request if the system is in a disaster recovery mode;
comparing a priority rating for the change request to a priority rating for end-user disruption; and
queuing the change request for later activation when the change priority rating is lower than the end-user disruption rating.

14. The system of claim 13, wherein the configurable system comprises a storage system.

15. A system comprising:
a configurable storage system;
a network interface, communicatively coupled to the configurable storage system;
a computer system, communicatively coupled to the network interface; and
a configuration control interface, communicatively coupled to the computer system, for presenting a plurality of selections from predetermined modes for updating a system configuration of the configurable storage system, wherein the predetermined modes comprise an immediate mode, a scheduled queued mode, a queued mode, and an optimized activation mode,
wherein the optimized activation mode comprises:
receiving a configuration change request from a user;
determining if a system is in a disaster recovery mode;
activating the change request if the system is in a disaster recovery mode;
comparing a priority rating for the change request to a priority rating for end-user disruption; and
queuing the change request for later activation when the change priority rating is lower than the end-user disruption rating.

16. A computer readable medium comprising instructions for:
presenting a plurality of selections for updating a system configuration from predetermined modes;
receiving a selected mode; and
executing the selected mode, wherein the predetermined modes comprise an immediate mode, a scheduled queued mode, a queued mode, and an optimized activation mode,
wherein the optimization activation mode comprises instructions for:
receiving a configuration change request from a user;
determining if a system is in a disaster recovery mode;
activating the change request if the system is in a disaster recovery mode;
comparing a priority rating for the change request to a priority rating for end-user disruption; and
queuing the change request for later activation when the change priority rating is lower than the end-user disruption rating.

17. The computer readable medium of claim 16, wherein the immediate mode comprises instructions for:
receiving a configuration change request from a user; and
activating the change request immediately.

18. The computer readable medium of claim 16, wherein the scheduled queued modes comprise instructions for:
receiving configuration change requests from a user;
queuing all the change requests; and
activating the change requests at a predetermined time.

19. The computer readable medium of claim 16, wherein the queued mode comprises instructions for:
receiving configuration change requests from a user;
queuing all the change requests; and
activating the change requests upon receiving a triggering event.

20. The computer readable medium of claim 19, wherein the triggering event comprises at least one of: the user manually activating the change requests, the user enabling an immediate mode, and the user logging off.

21. The computer readable medium of claim 16, wherein the optimized activation mode further comprises instructions for:
comparing a priority rating for the change request to a priority rating for administrator disruption; and
queuing the change request for later activation when the change priority rating is lower than the administrator disruption rating.

22. The computer readable medium of claim 21, wherein the optimized activation mode further comprises instructions for:
determining if the configuration change is repeated for more than one system device; and
queuing the change for later activation when the change is repeated.

23. The computer readable medium of claim 22, wherein the optimized activation mode further comprises instructions for:
comparing a priority rating for the queued change request to a predetermined threshold;
activating the change request at a predetermined time when the change priority rating is lower than the predetermined threshold; and
activating the change request upon receiving a triggering event when the change priority rating is greater than the predetermined threshold.

24. The computer readable medium of claim 23, wherein the triggering event comprises at least one of: the user manually activating the change requests, the user enabling an immediate mode, and the user logging off.

25. A system comprising:
means for presenting a plurality of selections from predetermined modes for updating a system configuration of a configurable system;
means for receiving a selected mode; and
means for executing the selected mode to configure the configurable system, wherein the predetermined modes comprise an immediate mode, a scheduled queued mode, a queued mode, and an optimized activation mode,
wherein the optimized activation mode comprises;
receiving a configuration change request from a user;
determining if a system is in a disaster recovery mode;
activating the change request if the system is in a disaster recovery mode;
comparing a priority rating for the change request to a priority rating for end-user disruption; and
queuing the change request for later activation when the change priority rating is lower than the end-user disruption rating.

26. The system of claim 25, wherein the configurable system comprises a storage system.

27. A method of updating a system configuration for a system comprising:
presenting a plurality of selections for updating a system configuration from predetermined modes;
receiving a selected mode; and executing the selected mode, wherein the predetermined modes comprise an immediate mode in which all configuration changes are immediately activated, a scheduled queued mode in which all configuration changes are queued until later and scheduled activation, a queued mode in which all configuration changes are queued until later manual activation, and an optimized activation mode in which the system determines the best method of updating the system configuration, wherein the optimized activation mode comprises:

receiving a configuration change request from a user;

determining if a system is in a disaster recovery mode;

activating the change request if the system is in a disaster recovery mode;

comparing a priority rating for the change request to a priority rating for end-user disruption; and queuing the change request for later activation when the change priority rating is lower than the end-user disruption rating.

* * * * *